United States Patent
Lee et al.

(10) Patent No.: US 9,201,787 B2
(45) Date of Patent: Dec. 1, 2015

(54) STORAGE DEVICE FILE SYSTEM AND BLOCK ALLOCATION

(71) Applicant: SAMSUNG ELECTRONICS CO., LTD., Suwon-Si, Gyeonggi-Do (KR)

(72) Inventors: Chul Lee, Hwaseong-Si (KR); Jae-Geuk Kim, Hwaseong-Si (KR); Chang-Man Lee, Seoul (KR); Joo-Young Hwang, Suwon-Si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 78 days.

(21) Appl. No.: 14/039,042

(22) Filed: Sep. 27, 2013

(65) Prior Publication Data

US 2014/0095772 A1    Apr. 3, 2014

(30) Foreign Application Priority Data

Sep. 28, 2012 (KR) .................. 10-2012-0109193

(51) Int. Cl.
*G06F 12/02* (2006.01)
*G06F 3/06* (2006.01)

(52) U.S. Cl.
CPC ............ *G06F 12/0246* (2013.01); *G06F 3/061* (2013.01); *G06F 3/0643* (2013.01); *G06F 3/0679* (2013.01); *G06F 2212/2022* (2013.01); *G06F 2212/7202* (2013.01)

(58) Field of Classification Search
None
See application file for complete search history.

(56) References Cited

U.S. PATENT DOCUMENTS

| | | | | |
|---|---|---|---|---|
| 6,016,553 A | * | 1/2000 | Schneider et al. | 714/21 |
| 6,182,088 B1 | | 1/2001 | Kawakami et al. | |
| 6,678,785 B2 | * | 1/2004 | Lasser | 711/103 |
| 7,899,989 B2 | | 3/2011 | Moore et al. | |
| 7,934,074 B2 | * | 4/2011 | Lee et al. | 711/217 |
| 8,176,103 B2 | | 5/2012 | Seo et al. | |
| 9,009,433 B2 | * | 4/2015 | Ryu | 711/165 |
| 2002/0032835 A1 | * | 3/2002 | Li et al. | 711/114 |
| 2003/0065876 A1 | * | 4/2003 | Lasser | 711/103 |

(Continued)

FOREIGN PATENT DOCUMENTS

| | | |
|---|---|---|
| JP | 05-020142 | 1/1993 |
| JP | 11-143764 | 5/1999 |
| JP | 2000-148550 | 5/2000 |
| JP | 2001-282588 | 10/2001 |
| KR | 100818993 | 4/2008 |
| KR | 1020120134917 | 12/2012 |

OTHER PUBLICATIONS

'Log-structured file systems: There's one in every SSD' by Valerie Aurora, Sep. 18, 2009.*

(Continued)

*Primary Examiner* — Steven Snyder
(74) *Attorney, Agent, or Firm* — Volentine & Whitt, PLLC (57) ABSTRACT

A computing system a storage device and a file system. The storage device includes a storage area having flash memory. The file system is configured to divide the storage area into multiple zones, multiple sections and multiple blocks, and to write a log in each block. The file system includes a block allocation module. The block allocation module is configured to allocate a target block, in which a log is to be written, by a continuous block allocation method according to which a block having a continuous address with a most recently selected block is set as the target block. The block allocation module is further configured to find a free section from the multiple sections when it is not possible to allocate the target block by the continuous block allocation method, and to set a block in the found free section as the target block.

15 Claims, 10 Drawing Sheets

(56) References Cited

U.S. PATENT DOCUMENTS

| | | | |
|---|---|---|---|
| 2007/0016721 A1* | 1/2007 | Gay | 711/103 |
| 2009/0157948 A1* | 6/2009 | Trichina et al. | 711/103 |
| 2009/0177857 A1* | 7/2009 | Butterworth et al. | 711/162 |
| 2010/0100667 A1* | 4/2010 | Kang et al. | 711/103 |
| 2010/0169544 A1* | 7/2010 | Eom et al. | 711/103 |
| 2010/0312959 A1* | 12/2010 | Petit et al. | 711/112 |
| 2011/0022801 A1* | 1/2011 | Flynn | 711/120 |
| 2011/0258391 A1* | 10/2011 | Atkisson et al. | 711/118 |
| 2012/0124294 A1* | 5/2012 | Atkisson et al. | 711/135 |
| 2012/0311241 A1* | 12/2012 | Lee | 711/103 |
| 2013/0117520 A1* | 5/2013 | Ryu | 711/165 |
| 2013/0166828 A1* | 6/2013 | Chun | 711/103 |

OTHER PUBLICATIONS

'An Implementation of a Log-Structured File System for UNIX' by Margo Seltzer et al., 1993 Winter USENIX—Jan. 25-29, 1993.*
'Samsung creates flash-friendly, open source file system: F2FS' by Rick Burgess, Oct. 8, 2012.*
'An f2fs teardown' by Neil Brown, Oct. 10, 2012.*
'The Design and Implementation of a Log-Structured File System' by Mendel Rosenblum and John K. Ousterhout, copyright 1992, ACM.*
'Flash-Friendly File System (F2FS)' by Jaegeuk Kim, presented at KLF 2012, Oct. 12, 2012.*

* cited by examiner

STORAGE DEVICE FILE SYSTEM AND BLOCK ALLOCATION

CROSS-REFERENCE TO RELATED APPLICATION

A claim for priority under 35 U.S.C. §119 is made to Korean Patent Application No. 10-2012-0109193, filed on Sep. 28, 2012, in the Korean Intellectual Property Office, the entire contents of which are hereby incorporated by reference.

BACKGROUND

The present inventive concept relates to a computing system and a method for managing data in the computing system.

When a file system stores a file in a storage device, the file is stored in the storage device as file data and metadata. The file data contains content of the file to be stored by a user application, and the metadata contains file attributes, a block location at which the file data is stored, and so on.

Meanwhile, when a file system stores a file from a storage device, it is necessary to first allocate a storage area of the file to be stored. Here, if the storage area of the to-be-stored file is allocated in consideration of storage device characteristics, read and write performance of system can be enhanced.

SUMMARY

Various embodiments provide a computing system having enhanced read and write performance, as well as a method for managing data in a computing system having enhanced read and write performance. The embodiments will be described in or be apparent from the following description.

According to an aspect of the inventive concept, there is provided a computing system including a storage device and a file system. The storage device includes a storage area having flash memory. The file system is configured to divide the storage area into multiple zones, multiple sections and multiple blocks, and to write a log in each block. The file system includes a block allocation module. The block allocation module is configured to allocate a target block, in which a log is to be written, by a continuous block allocation method according to which a block having a continuous address with a most recently selected block is set as the target block. The block allocation module is further configured to find a free section from the multiple sections when it is not possible to allocate the target block by the continuous block allocation method, and to set a block in the found free section as the target block.

According to another aspect of the inventive concept, there is provided a method for managing data in a computing system. The method includes dividing a storage area of a storage device into multiple blocks, multiple sections and multiple zones; setting a first block of the multiple blocks in a first section of the multiple sections as a first target block in which first data is to be written, the first section being in a first zone of the multiple zones; and determining whether a second block having an address continuous to the first block is a free block. When the second block is determined to be a free block, the second block is set as a second target block in which second data is to be written after the first data is written in the first target block. When the second block is determined not to be a free block, setting a third block in a second section of the multiple sections different from the first section as the second target block in which the second data is to be written after the first data is written in the first target block.

According to another aspect of the inventive concept, there is provided a computing system including a storage device having a storage area, and a host configured to control writing of data in the storage device. The host includes a file system configured to divide the storage area into multiple zones, each zone including multiple sections, and each section including multiple blocks. The file system includes a block allocation module configured to allocate target blocks in which data are to be written by setting as a target block a free block having a continuous address with a previous target block, in which previous data is written, in the same section as the previous target block. When there is no free block having a continuous address with the previous target block, the target block is set as a free block in a different section of the multiple sections in the same zone as the previous target block. When the different section in the same zone as the previous target block is not available, the target block is set as a free block in another different section of the multiple sections in another zone than the zone of the previous target block.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

The inventive concept will now be described more fully with reference to the accompanying drawings, in which exemplary embodiments of the inventive concept are shown.

The inventive concept may, however, be embodied in many different forms and should not be construed as being limited to the embodiments set forth herein; rather, these embodiments are provided so that this disclosure will be thorough and complete, and will fully convey the concept of the inventive concept to one of ordinary skill in the art. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the inventive concept. In the drawings, like reference numerals denote like elements throughout, and the sizes or thicknesses of elements and layers may be exaggerated for clarity of explanation.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "exemplary" indicates an illustration or example.

It will be understood that, although the terms first, second, etc., may be used herein to describe various elements, these elements should not be limited by these terms. These terms are only used to distinguish one element from another element. Thus, for example, a first element, a first component or a first section discussed below could be termed a second element, a second component or a second section without departing from the present teachings.

Unless defined otherwise, all technical and scientific terms used herein have the same meaning as commonly understood by one of ordinary skill in the relevant art belongs. It is noted that the use of any and all examples, or exemplary terms provided herein is intended merely to better illuminate the inventive concept and is not a limitation on scope unless otherwise specified. Further, unless defined otherwise, all terms defined in generally used dictionaries may not be overly interpreted.

Figure 1:
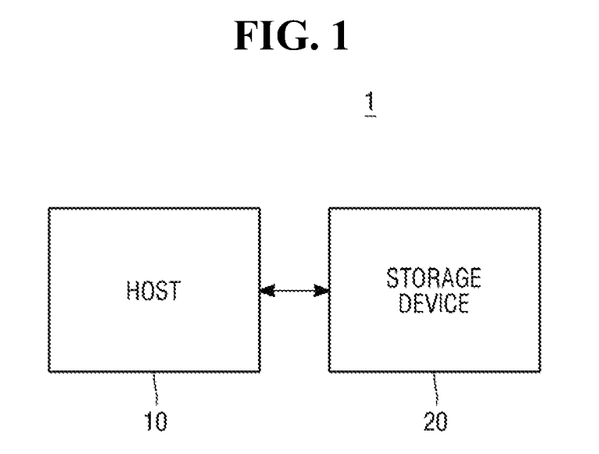
FIG. 1 is a block diagram of a computing system, according to an embodiment of the inventive concept.
Figure 2:
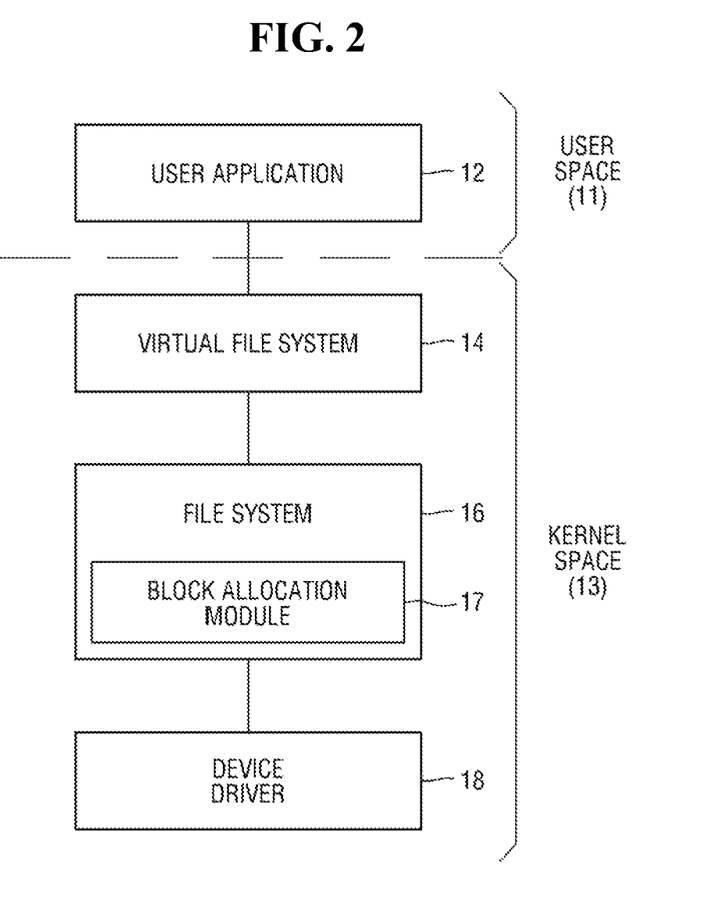
FIG. 2 is a block diagram of a host shown in FIG. 1, according to an exemplary embodiment of the inventive concept.
Figure 3:
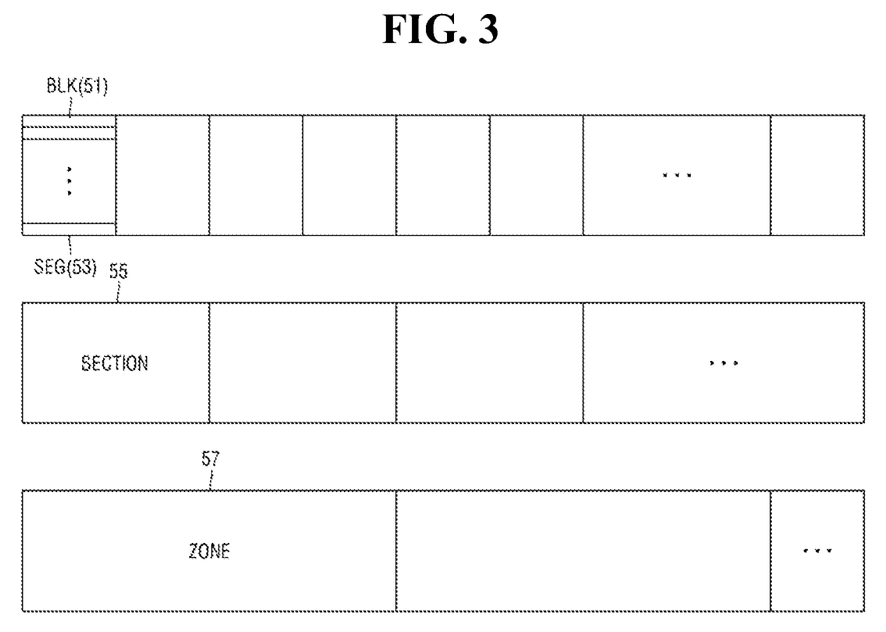
FIG. 3 is a block diagram of a storage device shown in FIG. 1, according to an embodiment of the inventive concept.
Figure 4:
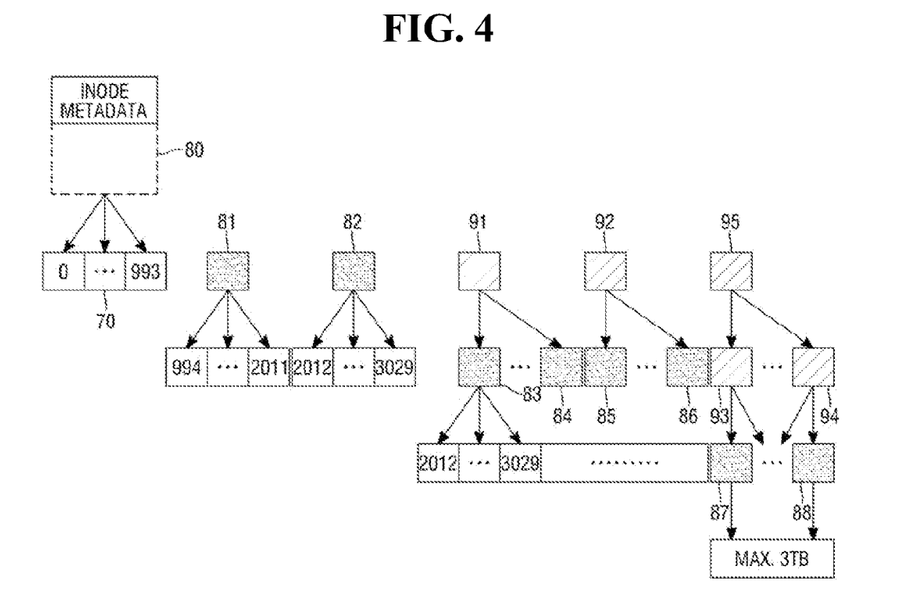
FIG. 4 illustrates a structure of a file stored in the storage device shown in FIG. 1, according to an embodiment of the inventive concept.
Figure 5:
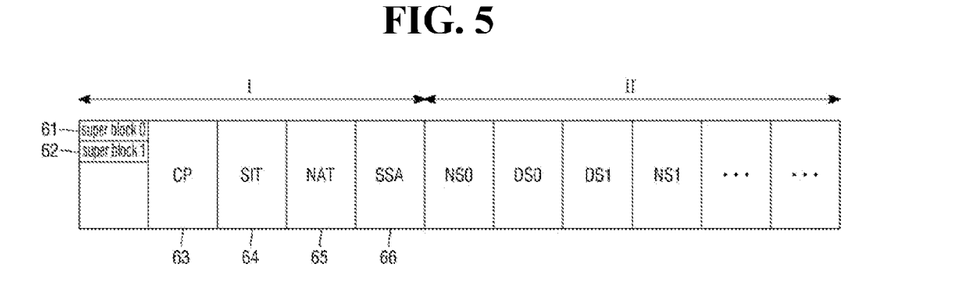
FIG. 5 is a block diagram for explaining the storage device shown in FIG. 1, according to an embodiment of the inventive concept.
Figure 6:
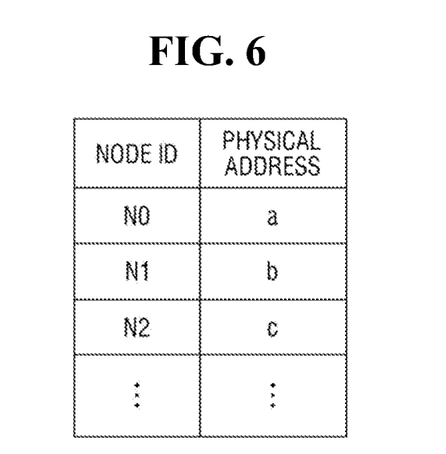
FIG. 6 illustrates a node address table, according to an embodiment of the inventive concept.

Hereinafter, a computing system according to an exemplary embodiment of the inventive concept will now be described with reference to FIGS. 1 to 6. FIG. 1 is a block diagram of a computing system, according to an exemplary embodiment. FIG. 2 is a block diagram of a host shown in FIG. 1, according to an exemplary embodiment. FIG. 3 is a block diagram of a storage device shown in FIG. 1, according to an exemplary embodiment. FIG. 4 illustrates a structure of a file stored in the storage device shown in FIG. 1, according to an exemplary embodiment. FIG. 5 is a block diagram for explaining the storage device shown in FIG. 1, according to an exemplary embodiment. FIG. 6 illustrates a node address table, according to an exemplary embodiment.

First, referring to FIG. 1, a computing system 1 includes a host 10 and a storage device 20. The host 10 and the storage device 20 are configured to communicate with each other. For example, the host 10 and the storage device 20 may communicate with each other via one of various protocols, such as a Universal Serial Bus (USB) protocol, a Multimedia Card (MMC) protocol, a Peripheral Component Interconnection (PCI) protocol, a PCI-Express (PCI-E) protocol, an Advanced Technology Attachment (ATA) protocol, a Serial ATA (SATA) protocol, a Small Computer Small Interface (SCSI) protocol, an Enhanced Small Disk Interface (ESDI) protocol, and an Integrated Drive Electronics (IDE) protocol, but are not limited thereto. The host 10 controls the storage device 20. For example, the host 10 may write data in the storage device 20 and/or may read data from the storage device 20.

Referring to FIG. 2, the host 10 includes a user space 11 and a kernel space 13. Various components shown in FIG. 2 may refer to software and/or hardware, such as a field-programmable gate array (FPGA) or application-specific integrated circuit (ASIC), for example. However, the components are not limited to software or hardware, and may be configured to reside in an addressable storage medium or to execute one or more processors. Also, functions provided by the components may be implemented by further divided components or may be implemented by a single component performing a particular function using a plurality of subcomponents.

The user space 11 includes an area in which a user application 12 is executed. The kernel space 13 is a restrictively reserved area for executing a kernel. In order to access the kernel space 13 from the user space 11, a system call may be used.

In the depicted embodiment, the kernel space 13 includes a virtual file system 14, a file system 16, and a device driver 18. Here, the file system 16 may be implemented using one or more file systems. In various embodiments, the file system 16 may include a flash-friendly file system (F2FS), for example, described below.

In some embodiments, the file system 16 divides a storage area of the storage device 20 into a plurality of blocks, sections and zones. The file system 16 writes logs received from the user application 12 in respective blocks, as described below in more detail.

As shown, the file system 16 includes a block allocation module 17. In various embodiments, the block allocation module 17 allocates a target block, in which a log is to be written, by a continuous block allocation method according to which a block having a continuous address with a most recently selected block, is set as the target block. When it is not possible to allocate a target block using the continuous block allocation method, a free section is found from the plurality of sections, and the target block is set to a free block in the found free section. The free block selected as the target block may be the first available free block in the found free section based on corresponding block addresses. A free section may be a section in which all blocks are free blocks. A free section found in the same zone as the most recent selected block is selected over a free section found in a different zone from the zone of the most recently selected block. Operations of the block allocation module 17 are described below in more detail with reference to FIG. 9.

The virtual file system 14 allows one or more file systems 16 to operate with respect to each other. For example, in order to perform read/write operations on different file systems 16 of different media, the virtual file system 14 may use standardized system call. Therefore, a system call, for example, open( ) read( ) or write( ), can be used irrespective of the types of file systems 16. In other words, the virtual file system 14 is an abstraction layer existing between the user space 11 and the file system 16.

The device driver 18 is responsible for interfacing between hardware and the user application (or operating system). For example, the device driver 18 may be a program necessary for normal operation of the hardware under a given operating system.

Hereinafter, the operation the file system 16 is described, assuming that file system 16 includes an F2FS, for purposes of illustration. The F2FS therefore controls the storage device 20, although the file system 16 is not limited as illustrated herein, and the types of file system 16 may vary, as would be apparent to one of ordinary skill in the art.

The storage device 20 may include, but is not limited to, various kinds of card storages, such as a solid state disk/drive (SSD), a hard disk drive (HDD) or eMMC, data servers, and so on.

The storage device 20 may be configured as shown in FIG. 3, for example. A segment (SEG) 53 includes a plurality of blocks (BLK) 51, a section (SECTION) 55 includes a plurality of segments 53 (and thus the corresponding pluralities of blocks), and a zone (ZONE) 57 includes a plurality of sections 55. For example, the block 51 may have a size of 4 Kbytes, and the segment 53 may include 512 blocks 51, so that each segment 53 has a size of 2 Mbytes. The configuration may be determined when the storage device 20 is formatted, although the various embodiments are not limited thereto. Sizes of the section 55 and the zone 57 may be modified. In the F2FS file system, for example, all data may be read/written in 4 Kbyte page units. That is, one-page of data is stored in the block 51, and multiple-page data is stored in the segment 53.

The file stored in the storage device 20 may have a referencing structure, as shown in FIG. 4, for example. One file may have file data containing content of a file to be stored by a user application (e.g., user application 12 in FIG. 2), and metadata containing file attributes, a block location at which the file data is stored, and so on. Here, data blocks 70 are spaces for storing file data, and node blocks 80, 81 to 88 and 91 to 95 are spaces for storing metadata. Node block 80 may be an inode block, node blocks 81 to 88 may be direct node blocks, and node blocks 91 to 95 may be indirect node blocks.

The direct node blocks 81 to 88 include data pointers pointing to respective data blocks 70. The indirect node blocks 91 to 95 include pointers pointing to node blocks 83 to 88 (that is, lower node blocks), other than the data blocks 70. The indirect node blocks 91 to 95 may include first indirect node blocks (e.g., first indirect node blocks 91 to 94) and second indirect node blocks (e.g., second indirect node block 95). In the depicted example, the first indirect node blocks 91 to 94 include first node pointers pointing to the direct node blocks 83 to 88, and the second indirect node block 95 includes second node pointers pointing to the first indirect node blocks 93 and 94.

The inode block 80 may include one or more of data pointers pointing directly to the data blocks (e.g., data block 70), first node pointers pointing to direct node blocks (e.g., direct node blocks 81 and 82), second node pointers pointing to first indirect node blocks (e.g., first indirect node blocks 91 and 92), and third node pointers pointing second indirect node blocks (e.g., second indirect node block 95).

Here, a file may have a maximum size, for example, 3 Tbytes (TB). Such a large-capacity file may have the following reference format, for example: the inode block 80 may include 994 data pointers, which point to 994 data blocks 70, respectively. The number of the first node pointers may be two, which point to two direct node blocks 81 and 82, respectively. The number of the second node pointers may be two, which point to two first indirect node blocks 91 and 92, respectively. The number of the third node pointers may be one, which points to the second indirect node block 95. In addition, each file has inode pages including inode metadata.

Meanwhile, as shown in FIG. 5, in the computing system 1 according to an exemplary embodiment, the storage device 20 is divided into a first area I and a second area II. For example, the storage device 20 may be divided into the first area I and the second area II when formatting the file system 16, although the various embodiments are not limited thereto. The first area I is a space in which various kinds of information managed by the overall system is stored, including the number of currently allocated files, the number of valid pages and position information, for example. The second area II is a space in which various kinds of directory information actually used by users, data, file information, and the like, are stored. In an embodiment, the first area I may be stored in a head part of the storage device 20, and the second area II may be stored in a tail part of the storage device 20, where the head part is positioned ahead of the tail part in view of physical addresses.

In more detail, the first area I may include super blocks 61 and 62, a CheckPoint area (CP) 63, a segment information table (SIT) 64, a node address table (NAT) 65, and a segment summary area (SSA) 66. Default information of the file system 16 is stored in the super blocks 61 and 62. For example, information such as sizes of blocks 51, the number of blocks 51, and state flags of the file system 16 (e.g., clean, stable, active, logging, unknown, etc.) may be stored in the super blocks 61 and 62. As shown, the number of super blocks 61 and 62 may be two. Also, the same content may be stored in each of the super blocks 61 and 62, so even if failure occurs in one of the super blocks 61 and 62, the other may be used.

A checkpoint is stored in the CheckPoint area (CP) 63. A checkpoint is a logical interruption point, where states up to the interruption point are perfectly preserved. If an accident occurs during operation of the computing system that causes a shutdown (such as a sudden power off, for example), the file system 16 may store data using the preserved checkpoint. The checkpoint may be generated periodically or at the time of the system shutdown, although the various embodiments are not limited thereto.

As shown in FIG. 6, for example, the NAT 65 may include node identifiers NODE IDs corresponding to nodes, and physical addresses corresponding to the node identifiers NODE IDs, respectively. For example, a node block corresponding to node identifier N0 may correspond to physical address a, a node block corresponding to node identifier N1 may correspond to physical address b, and a node block corresponding to node identifier N2 may correspond to physical address c. All nodes, including inode, direct nodes and indirect nodes, have intrinsic node identifiers, which may be allocated from the NAT 65. That is, the NAT 65 may include node identifiers of inode, direct nodes and indirect nodes. Various physical addresses corresponding to the respective node identifiers may be updated.

The SIT 64 includes the number of valid pages of each segment and a bitmap of multiple pages. The bitmap means 0 or 1, which indicates whether each page is valid or not valid. The SIT 64 may be used in a cleaning operation (or garbage collection). In particular, when the cleaning operation is performed, the bitmap may reduce unnecessary read requests. In addition, the bitmap may be used when blocks are allocated in adaptive data logging.

The SSA 66 is an area in which summary information of each segment of the second area II is gathered. In particular, the SSA 66 describes node information for blocks of each segment in the second area II. The SSA 66 may be used in the cleaning operation (or garbage collection). In particular, in order to identify locations of data blocks 70 or lower node blocks (e.g., direct node blocks), the node blocks 80, 81 to 88, and 91 to 95 include a list or addresses of node identifiers. Conversely, the SSA 66 provides references by which the data blocks 70 or lower node blocks 80, 81 to 88 and 91 to 95 can identify positions of higher node blocks 80, 81 to 88 and 91 to 95. The SSA 66 includes a plurality of segment summary blocks. One segment summary block contains information concerning one segment positioned in the second area II. In addition, the segment summary block is composed of multiple portions of summary information, and one portion of summary information corresponds to one data block or one node block.

The second area II may include data segments DS0 and DS1 separated from each other and node segments NS0 and NS1. Portions of data are stored in the data segments DS0 and DS1, and nodes are stored in the node segments NS0 and NS1. If the data and nodes are separated at different regions, the segments can be efficiently managed and the data can be effectively read within a short time when the data is read.

Further, write operations in the second area II are performed using a sequential access method, while write operations in the first area I are performed using a random access method. As mentioned above, the second area II may be stored in a tail part of the storage device 20 and the first area I may be stored in a head part of the storage device 20, where the head part is positioned ahead of the tail part in view of physical addresses.

The storage device 20 may be a solid state disk/drive (SSD), in which case a buffer may be provided in the SSD. The buffer may be a single layer cell (SLC) memory, for example, having fast read/write operation speed. Therefore, the buffer may speed up the write operation based on the random access method in a limited space.

In FIG. 5, the first area I is depicted as having the super blocks 61 and 62, CP 63, SIT 64, NAT 65 and SSA 66 arranged in that order, although the various embodiments are not limited thereto. For example, the locations of SIT 64 and NAT 65 may be reversed, and locations of NAT 65 and SSA 66 may also be reversed.

Meanwhile, as described above, when the storage device 20 is a flash memory based storage device, the read and write performance of computing system 1 may be enhanced when the block allocation module 17 of the file system 16 allocates blocks under rules (1) to (4), discussed below.

Rule (1): When the flash memory based storage device 20 writes data, and a block (e.g., block 51 in FIG. 3) is allocated by a continuous block allocation method for the overall volume, system performance is highest and lifetime of the storage device 20 is lengthened. Here, continuous block allocation method means that, when a block (e.g., block 51 in FIG. 3) in which data has recently been written has address (X), the address of the selected next block in which data is to be written (defined as a target block) becomes (X+1).

Rule (2): As in rule (1), if continuous block allocation is performed in a virtual area in which the overall volume is uniformly divided, an area having performance similar to that in rule (1) exists even when continuous block allocation is not performed on the overall volume. The area is a virtual area in the storage device 20. For example, the area may correspond to a section (e.g., section 55 in FIG. 3). In some embodiments, the section (e.g., section 55 in FIG. 3) may be a garbage collection unit of the storage device 20.

Rule (3): As in rule (2), the overall volume is divided into multiple sections (e.g., section 55 in FIG. 3), and the block (e.g., block 51 in FIG. 3) is set at one time in only one of the sections (e.g., section 55 in FIG. 3) in the virtual area, that is a collection of the multiple sections, instead of selecting only one of the sections for setting the block (e.g., block 51 in FIG. 3). Here, even when the block (e.g., block 51 in FIG. 3) is set in different sections (e.g., section 55 of FIG. 3) of different areas, an area having performance similar to that in rule (2) exists. The area is also a virtual area in the storage device 20, which is illustrated by way of example, and may correspond to a zone (e.g., zone 57 in FIG. 3).

Rule (4): System performance is advantageously enhanced by minimizing zone crossings, where the block (e.g., block 51 in FIG. 3) is alternately allocated in multiple zones (e.g., zone 57 in FIG. 3).

Figure 7:
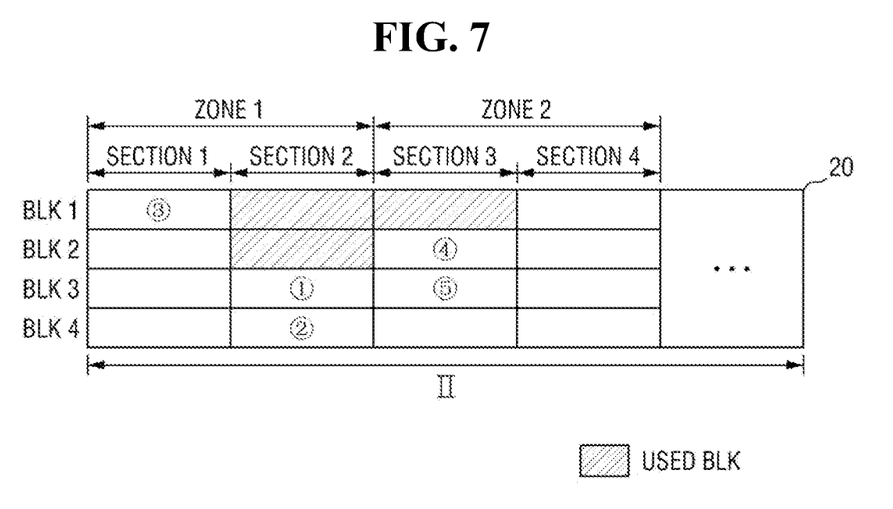
FIG. 7 illustrates a block allocation method by which read and write performance of a flash memory based storage device can be enhanced, according to an embodiment of the inventive concept.

Hereinafter, rules (1) to (4) are addressed in more detail below, with reference to FIGS. 7 and 8. FIG. 7 illustrates a block allocation method by which read and write performance of a flash memory based storage device can be enhanced.

FIG. 7 illustrates an example of when block allocation is performed in conformity with rules (1) to (4). As described above, data is written in the second area II of the storage device 20 by a sequential access method. Thus, it is noted that only the second area II is illustrated in FIG. 7, and for brevity, the segment (e.g., segment 53 in FIG. 3) is not illustrated in FIG. 7.

Referring to FIG. 7, first data (1) was allocated to a third block (BLK 3) of a second section (SECTION 2) in a first zone (ZONE 1). In addition, second data (2) was allocated to a fourth block (BLK 4) adjacent to BLK 3 of SECTION 2 in ZONE 1. Assuming that the address of BLK 3 is X, the address of BLK 4 is X+1. That is, rule (1) is observed.

Subsequently, third data (3) was allocated to a first block (BLK 1) of a first section (SECTION 1) in ZONE 1. That is, while rule (1) was not observed, rule (2) was observed.

Next, fourth data (4) was allocated to a second block (BLK 2) of a third section (SECTION 3) in a second zone (ZONE 2). Here, the fourth data (4) was not subjected to continuous block allocation with respect to the third data (3). However, the fourth data (4) was allocated to a different zone from that of the third data (3). Fifth data (5) was allocated to BLK 3 of SECTION 3 in ZONE 2, and subjected to continuous block allocation, suggesting that the rule (3) was observed.

Figure 8:
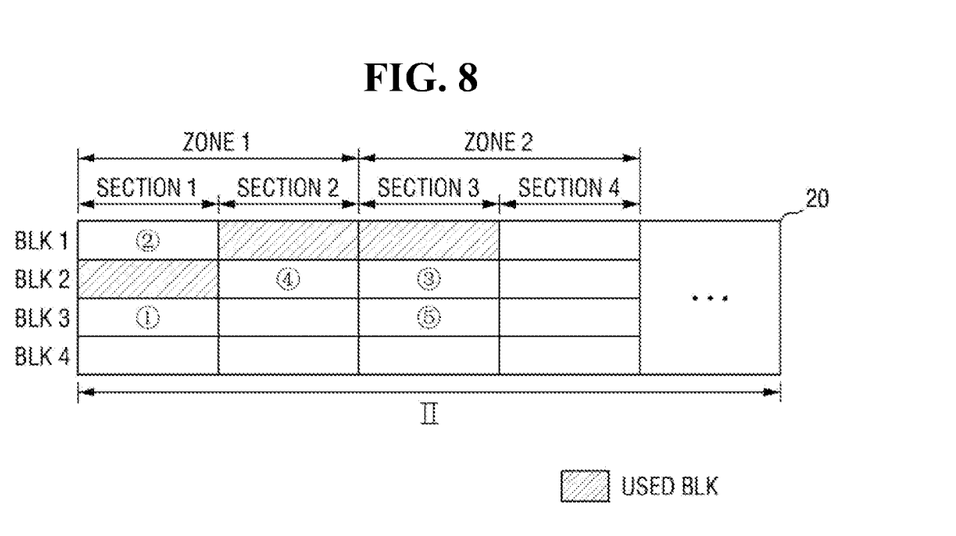
FIG. 8 illustrates an alternative block allocation method by which read and write performance of a flash memory based storage device.

FIG. 8 illustrates an example of when block allocation is not performed in conformity with the rules (1) to (4).

Referring to FIG. 8, the first data (1) was allocated to a third block (BLK 3) of a first section (SECTION 1) in a first zone (ZONE 1). The second data (2) was allocated to a first block (BLK 1) of SECTION 1 in ZONE 1. Thus, the first data (1) and the second data (2) were not subjected to continuous block allocation.

Next, the third data (3) was allocated to a second block (BLK 2) of a third section (SECTION 3) in a second zone (ZONE 2). In addition, the fourth data (4) was allocated to a second block (BLK 2) of a second section (SECTION 2) in ZONE 1. The fifth data (5) was allocated to a third block (BLK 3) of SECTION 3 in ZONE 2. Here, unnecessary zone crossing was performed between the third data (3) and the fourth data (4), and the fifth data (5) was not subjected to continuous block allocation with respect to the fourth data (4) even though it was possible to perform the continuous block allocation. Thus, the rules (1) to (4) were not observed. That is to say, the read and write performance is poorer than that shown in FIG. 7.

Figure 9:
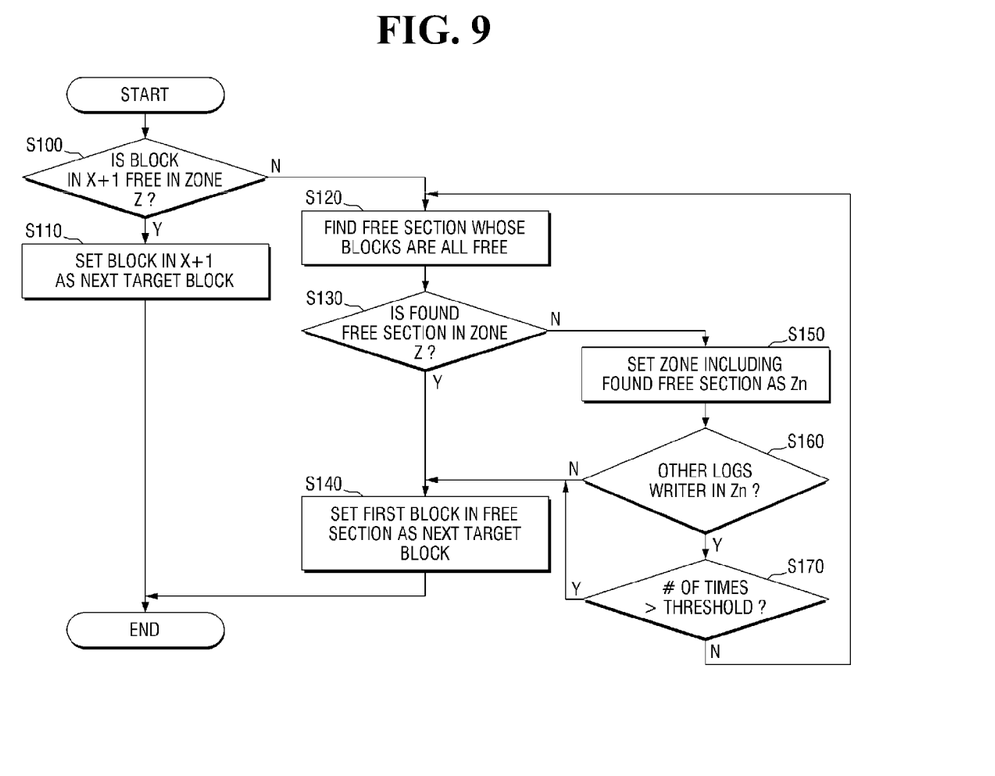
FIG. 9 is a flowchart for explaining a data management method of a computing system, according to an embodiment of the inventive concept.

FIG. 9 is a flowchart for explaining a data read method of a computing system, according to an exemplary embodiment. The data read method of the computing system will now be described with reference to FIG. 9.

For purpose of illustration, it is assumed that a block that has most recently been set to store a log L (the most recently selected target block) has an address (X). Here, the log L may be a set of data for which a host (e.g., host 10 in FIG. 1) issued a write command to write the set of data in a storage device (e.g., storage device 20 in FIG. 1). It is further assumed that the block is included in a Zone Z.

Referring to FIG. 9, continuous block allocation is first attempted. In particular, it is determined whether or not a block having an address (X+1) in the zone Z is free (S100). When the block in the address (X+1) is a free block, the block in the address (X+1) is set as a next target block (S110). Continuous block allocation provides the best performance according to rule (1), stated above. Thus, when the block in the address (X+1) is free, and the block in the address (X+1) and the block in the address (X) are positioned in the same zone Z, the block in the address (X+1) is set as the next target block.

When the corresponding block is not a free block, a free section having blocks that are all free is found (S120). Here, in order to minimize zone crossings, an attempt is made to find a free section among the sections included in the zone Z. Therefore, it is first determined whether or not the found free section is in the zone Z (S130). When the found free section is in the zone Z, the first block of the found free section is set as the next target block (S140). The first block may be the first available free block as determined in view of the corresponding block addresses. This is consistent with rule (4), where the less frequently zone crossings occur, the better the performance becomes. Therefore, when a free section is found without a zone crossing, the first block of the found free section may be set as the next target block.

Referring again to FIG. 9, when the found free section is positioned in a different zone from the zone Z, the zone including the found free section is set as zone Zn (S150). Then, it is determined whether or not there are other logs that have already been written in zone Zn, that is, logs other than the log L (S160). If not, the first block in the found free section is set as the next target block (S140). In particular, if no other logs that have already been written exist in the zone Zn (that is, if blocks in the zone Zn are all free blocks), a data write operation is most likely to be based on the continuous block allocation stated by the rule (1) when the log L is written in the zone Zn, minimizing the possibility of zone crossings, as described above in the rule (4). Therefore, when no other logs have been written in the zone Zn, the first block of the found free section may be set as the next target block.

When other logs have already been written in the zone Zn, it is determined how many times that step S120 was performed (S170). When the number of times that step S120 has been performed is greater than a predetermined threshold, the first block in the found free section is set as the next target block (S140). However, when the number of times that step S120 has been performed is less than or equal to a predetermined threshold, a free section having blocks that are all free is again found (S120).

As described above, when the rules (1) to (4) are observed in writing the log L in the storage device 20, the read and write performance of the computing system 1 is enhanced.

Figure 10:
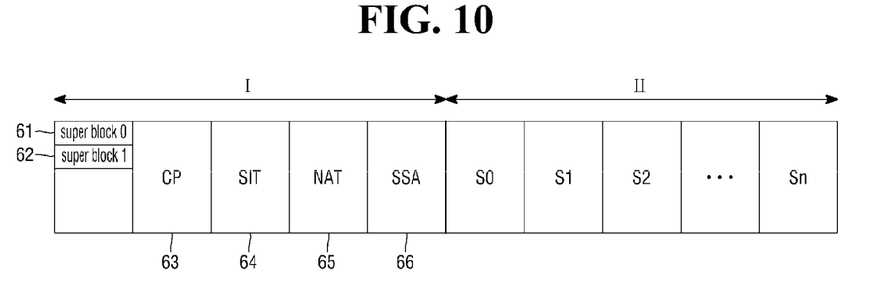
FIGS. 10 to 12 are block diagrams for explaining examples of configuring the storage device shown in FIG. 5, according to embodiments of the inventive concept.
Figure 11:
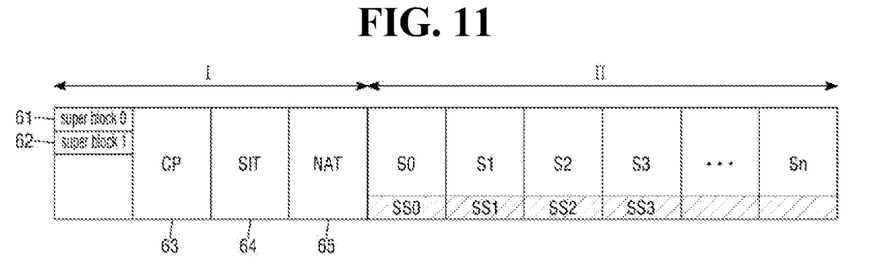
Figure 12:
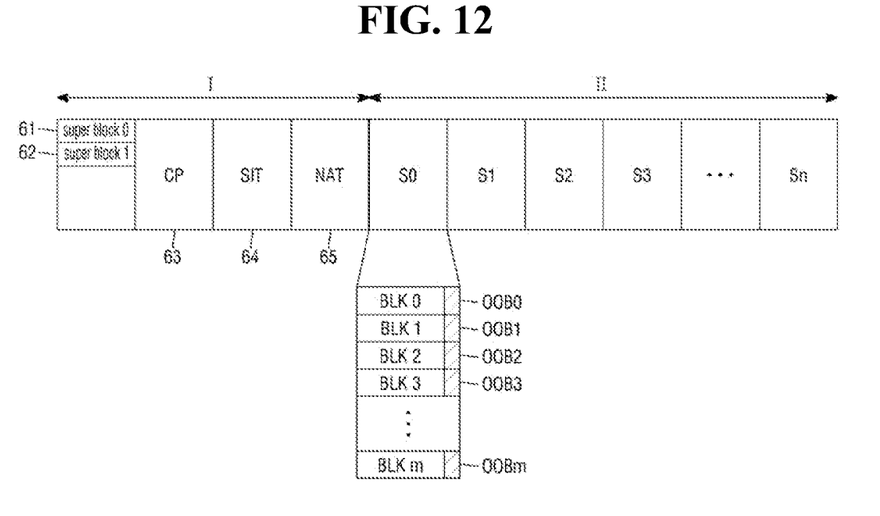

FIGS. 10 to 12 are block diagrams for explaining various examples of configuring the storage device shown in FIG. 5. For brevity, the following description will focus on differences from the previous embodiment shown in FIG. 5.

Referring to FIG. 10, in the storage device of the computing system according to another embodiment, the second area II includes segments S0 to Sn separated from each other, where n is a natural number. Both data and nodes may be stored in the respective segments S0 to Sn. In comparison, in the computing system according to the embodiment shown in FIG. 5, the storage device includes data segments DS0 and DS1 separated from each other and node segments NS0 and NS1. Portions of data are stored in the data segments DS0 and DS1, and nodes may be stored in the node segments NS0 and NS1.

Referring to FIG. 11 in the storage device of the computing system according to another embodiment, the first area I does not include a segment summary area (SSA) 66, as shown in FIG. 5. That is, the first area I includes super blocks 61 and 62, a checkpoint (CP) area 63, a segment information table (SIT) 64, and a node address table (NAT) 65.

The segment summary information may be stored in the second area II. In particular, the second area II includes multiple segments S0 to Sn, and each of the segments So to Sn is divided into multiple blocks. The segment summary information may be stored in at least one block SS0 to SSn of each of the segments S0 to Sn.

Referring to FIG. 12, in the storage device of the computing system according to another embodiment, the first area I does not include a segment summary area (SSA) 66, as shown in FIG. 5. That is, the first area I includes super blocks 61 and 62, a checkpoint (CP) area 63, segment information table (SIT) 64, and a node address table (NAT) 65.

The segment summary information may be stored in the second area II. The second area II includes multiple segments 53, each of the segments 53 is divided into multiple blocks BLK0 to BLKm, and the blocks BLK0 to BLKm may include OOB (Out Of Band) areas OOB1 to OOBm (where, m is a natural number), respectively. The segment summary information may be stored in the OOB areas OOB1 to OOBm.

Hereinafter, a system, to which the computing system according to embodiments of the inventive concept is applied, will be described. The system described hereinafter is merely exemplary, and embodiments of the inventive concept are not limited thereto.

Figure 13:
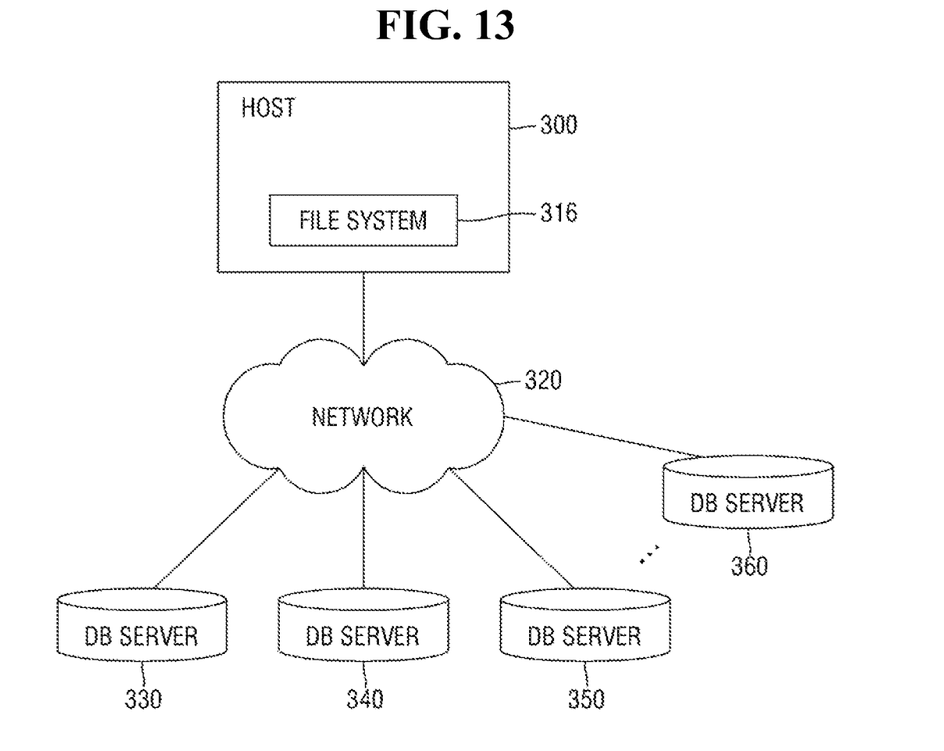
FIG. 13 is a block diagram for explaining a specific example of a computing system, according to embodiments of the inventive concept.

FIG. 13 is a block diagram for explaining a specific example of a computing system, according to exemplary embodiments.

Referring to FIG. 13 a host server 300 is connected to database (DB) servers 330, 340, 350 and 360 through a network 320. A file system 316 for managing data of the DB servers 330, 340, 350 and 360 is installed in the host server 300. The file system 316 may be any of the file systems described above with reference to FIGS. 1 to 12.

Figure 14:
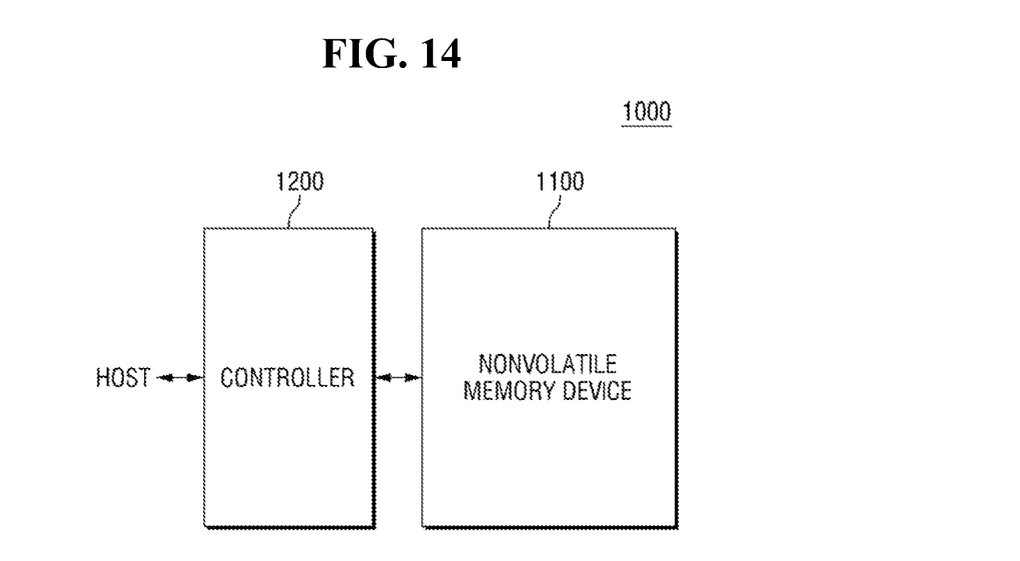
FIGS. 14 to 16 are block diagrams for explaining a specific example of a computing system, according to embodiments of the inventive concept.
Figure 15:
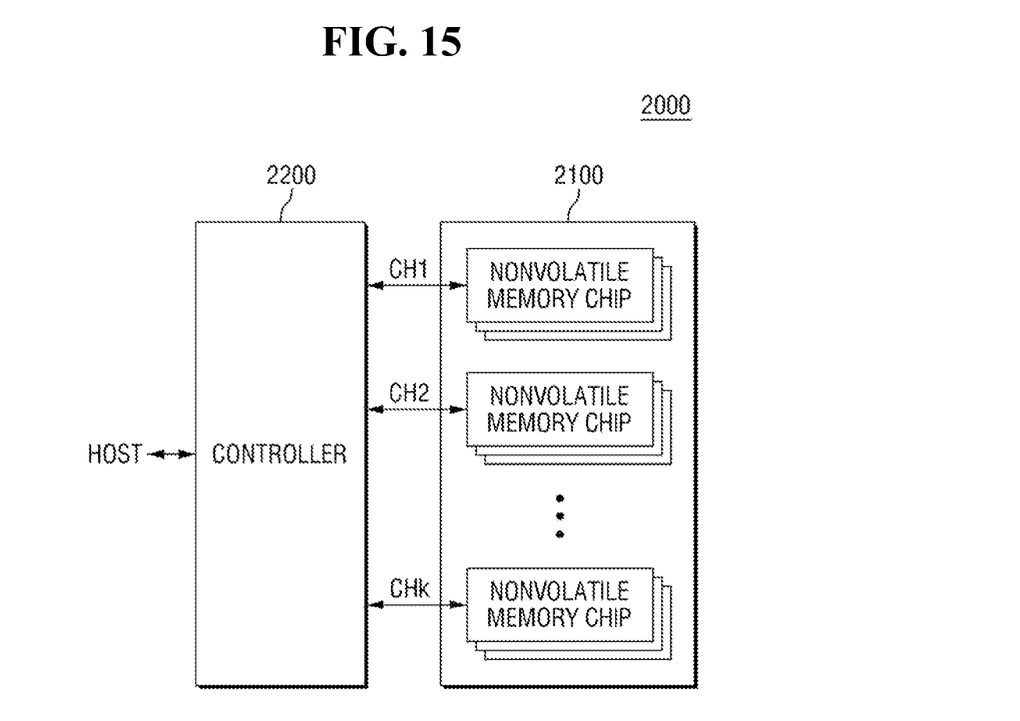
Figure 16:
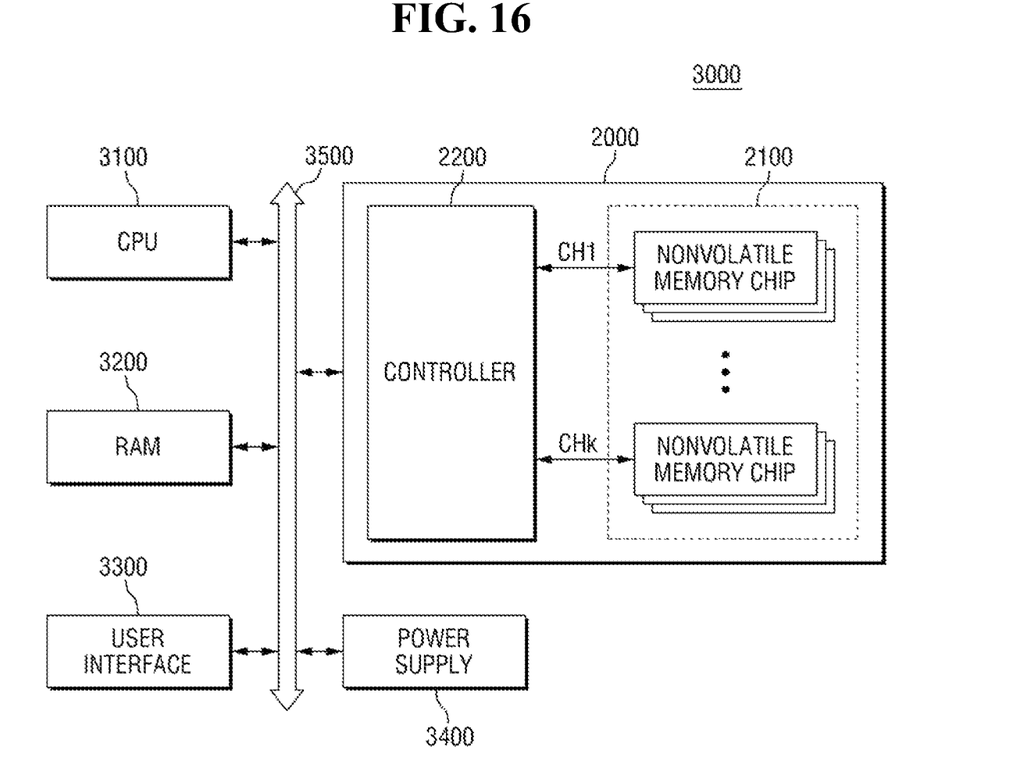

FIGS. 14 to 16 are block diagrams illustrating other examples of a computing system according to embodiments of the inventive concept.

Referring to FIG. 14, a storage device 1000 (corresponding to storage device 20 in FIG. 1) includes a nonvolatile memory device 1100 and a controller 1200. The nonvolatile memory device 1100 may be configured to store the super blocks 61 and 62, the CP area 63, the SIT 64, and the NAT 65, as discussed above.

The controller 1200 is connected to a host and the nonvolatile memory device 1100. In response to requests from host, the controller 1200 accesses the nonvolatile memory device 1100. For example, the controller 1200 may be configured to control read, write, erase and background operations of the volatile memory device 1100. The controller 1200 is provides interfacing between the nonvolatile memory device 1100 and the host. The controller 1200 is also configured to drive firmware for controlling the nonvolatile memory device 1100.

As an example, the controller 1200 may include well-known elements such as random access memory (RAM), a processing unit, a host interface and a memory interface. The RAM may be used as operation memory of the processing unit, a cache memory between the nonvolatile memory device 1100 and the host, and/or a buffer memory between the nonvolatile memory device 1100 and the host. The processing unit may control overall operation of the controller 1200.

The controller 1200 and the nonvolatile memory device 1100 may be integrated in one semiconductor device. For example, the controller 1200 and the nonvolatile memory device 1100 may be integrated in one semiconductor device, and thereby configuring a memory card. The controller 1200 and the nonvolatile memory device 1100, for example, may be integrated in one semiconductor device, and thereby configuring a PC card (e.g., personal computer memory card international association (CMCIA)), compact flash (CF) card, smart media card (SM/SMC), a memory stick, a multimedia card (e.g., MMC, RS-MMC and MMC micro), an SD card (e.g., SD, mini SD and micro SD), or a universal flash storage (UFS).

The controller 1200 and the nonvolatile memory device 1100 may be integrated in one semiconductor device, and thereby configuring a Solid State Disk/Drive (SSD). When the storage device 1000 is used as an SSD, the operation speed of the host connected to the memory system can be significantly improved.

As another example, the storage device 1000 may be formed of a computer, an ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game machine, a navigation system, a black box, a digital camera, a 3-dimensional television, a digital audio recorder/player, a digital picture/video recorder/player, a device capable of transmitting and receiving information at a wireless circumstance, one of various electronic devices constituting home network, one of various electronic devices constituting computer network, one of various electronic devices constituting telematics network, RFID, or one of various electronic devices constituting a computing system.

In addition, the nonvolatile memory device 1100 and/or the storage device 1000 may be packed by various packages, for example, such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

Referring to FIG. 15, a system 2000 includes a nonvolatile memory device 2100 and a controller 2200. The nonvolatile memory device 2100 includes multiple nonvolatile memory chips. The nonvolatile memory chips are divided into groups. The respective groups of the nonvolatile memory chips are configured to communicate with the controller 2200 through a common channel. In the illustrated embodiment, the nonvolatile memory chips communicate with the controller 2200 through first to kth channels CH1 to CHk, for example.

In FIG. 15, multiple nonvolatile memory chips are connected to one channel of the first to kth channels CH1 to CHk. However, it will be understood that the system 2000 may be modified such that one nonvolatile memory chip is connected to one channel of the first to kth channels CH1 to CHk.

Referring to FIG. 16, a system 3000 includes a central processing unit (CPU) 3100, random access memory (RAM) 3200, a user interface 3300, a power supply 3400, and the system 2000 of FIG. 15. The system 2000 is electrically connected to the CPU 3100, the RAM 3200, the user interface 3300 and the power supply 3400 through a system bus 3500. The data provided through the user interface 3300 or processed by the CPU 3100 is stored in the system 2000.

In FIG. 16, the nonvolatile memory device 2100 is connected to the system bus 3500 through the controller 2200. Alternatively, the nonvolatile memory device 2100 may be configured to be directly connected to the system bus 3500.

While the inventive concept has been described with reference to illustrative embodiments, it will be apparent to those of ordinary skill in the art that various changes and modifications may be made without departing from the spirit and scope of the present inventive concept. Therefore, it should be understood that the above embodiments are not limiting, but illustrative.

What is claimed is:

1. A computing system, comprising:
    a storage device comprising a storage area comprising flash memory; and
    a file system configured to divide the storage area into a plurality of zones, a plurality of sections and a plurality of blocks, and to write a log in each block of the plurality of blocks, the file system comprising a block allocation module,
    wherein the block allocation module is configured to allocate a target block, in which a log is to be written, by a continuous block allocation method according to which a block having a continuous address with a most recently selected block is set as the target block,
    wherein the block allocation module is further configured to find a free section from the plurality of sections when it is not possible to allocate the target block by the continuous block allocation method, and to set a block in the found free section as the target block,
    wherein the block in the found free section to be set as the target block is a block that is first in view of block addresses among blocks in the found free section, and
    wherein the found free section including the block to be set as the target block is a section that minimizes zone crossings in writing the log.

2. The computing system of claim 1, wherein each section of the plurality of sections is defined to be the same as a unit of the flash memory performing garbage collection.

3. The computing system of claim 1, wherein a size of each block is smaller than a size of each section, and the size of each section is smaller than a size of each zone.

4. The computing system of claim 1, wherein the storage area includes a first area and a second area, the log being written in the second area, and
    wherein write operations in the first area are performed using a random access method and write operations in the second area are performed using a sequential access method.

5. The computing system of claim 4, wherein a physical address of the first area is ahead of a physical address of the second area in the storage device.

6. The computing system of claim 4, wherein a node address table is stored in the first area, the node address table including a node identifier (NODE ID) corresponding to a node block and a physical address corresponding to the node identifier.

7. A method of managing data in a computing system, the method comprising:
dividing a storage area of a storage device into a plurality of blocks, a plurality of sections and a plurality of zones;
setting a first block of the plurality of blocks in a first section of the plurality of sections as a first target block in which first data is to be written, the first section being in a first zone of the plurality of zones;
determining whether a second block having an address continuous to the first block is a free block;
when the second block is determined to be a free block, setting the second block as a second target block in which second data is to be written after the first data is written in the first target block;
when the second block is determined not to be a free block, setting a third block in a second section of the plurality of sections different from the first section as the second target block in which the second data is to be written after the first data is written in the first target block,
wherein blocks in the second section are all free blocks, and wherein the third block is a block that is a first free block available in view of addresses among the blocks in the second section, and
wherein the third block is a block that minimizes zone crossings in writing the log.

8. The method of claim 7, wherein the second section is in the first zone.

9. The method of claim 7, wherein the second section is in a second zone different from the first zone.

10. The method of claim 7, wherein a storage area of the storage device is implemented by a flash memory.

11. The method of claim 10, wherein the storage area comprises a first area and a second area, wherein write operations in the first area are performed using a random access method and write operations in the second area are performed using a sequential access method, and the first data and the second data are written in the second area.

12. The method of claim 11, wherein a physical address of the first area is ahead of a physical address of the second area in the storage device.

13. A computing system, comprising:
a storage device comprising a storage area; and
a host configured to control writing of data in the storage device, the host comprising a file system configured to divide the storage area into a plurality of zones, each zone comprising a plurality of sections, and each section comprising a plurality of blocks, the file system comprising a block allocation module configured to allocate target blocks in which data are to be written by:
setting as a target block a free block having a continuous address with a previous target block, in which previous data is written, in the same section as the previous target block,
when there is no free block having a continuous address with the previous target block, setting as the target block a free block in a different section of the plurality of sections in the same zone as the previous target block,
when the different section in the same zone as the previous target block is not available, setting as the target block a free block in another different section of the plurality of sections in another zone than the zone of the previous target block,
wherein the different section is a free section, and the free block in the different section is a block that is first in view of block addresses among blocks in the free section, and
wherein the free section including the block to be set as the target block is a section that minimizes zone crossings in writing the log.

14. The computing system of claim 13, wherein the storage area comprises a flash memory.

15. The computing system of claim 14, wherein the file system comprises a flash-friendly file system (F2FS).

* * * * *